US005175878A

United States Patent [19]

Davis et al.

[11] Patent Number: 5,175,878

[45] Date of Patent: Dec. 29, 1992

[54] RADIO NETWORK WITH SWITCHING ARRANGEMENT FOR COUPLING RADIOS TO A SELECTED ANTENNA OUT OF A PLURALITY OF ANTENNAS

[75] Inventors: Bernard P. Davis, Pottersville, N.J.; George M. Reed, Tannersville, Pa.

[73] Assignee: AT&T Bell Laboratories, Murray Hill, N.J.

[21] Appl. No.: 474,562

[22] Filed: Feb. 2, 1990

[51] Int. Cl.[5] .............................................. H04B 7/00

[52] U.S. Cl. .................................. 455/103; 455/140; 455/277.1; 455/281

[58] Field of Search ........ 455/129, 132, 133, 136-138, 455/160, 272, 273, 103, 101, 277, 281, 282; 333/100, 101, 103, 106; 340/825.02, 825.03, 826

[56] References Cited

U.S. PATENT DOCUMENTS

| | | | |
|---|---|---|---|
| 4,395,772 | 7/1983 | Trested, Jr. | 375/40 |
| 4,752,968 | 6/1988 | Lindenmeier et al. | 455/277 |
| 4,761,822 | 8/1988 | Maile | 455/82 |
| 5,033,108 | 7/1991 | Lockwood | 455/12 |

FOREIGN PATENT DOCUMENTS 0190036 9/1985 Japan .

OTHER PUBLICATIONS

"Splitters and Hybrids Divide and Conquer High-Frequency Power", by J. Browne, Microwaves & RF, Oct. 1989.

"Phased Array Antennas", by A. A. Oliner & G. H. Knittel, *Artech House, Inc.*, Jun. 1970, pp. 292-300.

"Advanced Mobile Phone Service: Control Archetecture", by Z. C. Fluhr & P. T. Porter, Bell System Technical Journal, vol. 58, No. 1, Jan. 1979, pp. 43-69.

*Primary Examiner*—Reinhard J. Eisenzopf
*Assistant Examiner*—Chi H. Pham
*Attorney, Agent, or Firm*—A. G. Steinmetz

[57] ABSTRACT

The antennas of a cellular telephone system are each connected to a signal divider/combiner array which/divides combines the antenna connecting path(s) into a plurality of antenna-radio/radio-antenna connecting paths. The divider array aspect is used for signal reception and the combiner array aspect is used for signal transmission. Each of these antenna connecting paths is connected to a controllable switch which in turn selectively couples it to/from a second plurality of radio transceivers. The antenna transmission/receive paths comprising the signal divider/combiners are embodied as strip type transmission lines in a multi layer PCB with all the paths having equal transmission losses. Micro vias are provided to permit electrical access to the various layers. The controllable switches are surface mounted on the outside of the PCB and are coupled to the various dividers/combiner through the micro vias. Remote control of the switches permits a radio channel unit of transceiver to be connected to any one of the array of antennas.

4 Claims, 4 Drawing Sheets

RADIO NETWORK WITH SWITCHING ARRANGEMENT FOR COUPLING RADIOS TO A SELECTED ANTENNA OUT OF A PLURALITY OF ANTENNAS

FIELD OF THE INVENTION

This invention relates to radio systems and to the connection of radio transceivers to the antennas of the systems. It is particularly concerned with an arrangement to selectively couple radio transceivers to a plurality of antennas.

BACKGROUND OF THE INVENTION

Cell sites in a cellular radio telephone system include antenna arrays to provide radio service to the total area of the site. These arrays normally include an omnidirectional antenna and a plurality of directional antennas arranged for signal transmission in defined sectors or angular sweeps of the cell area and two omni-directional antennas and a plurality of directional antennas arranged for reception of mobile transmissions from defined sectors or angular sweeps of the cell area. Normally the number of radios connected to each directional antenna reflects the radio traffic in each sector. Since the connections are made manually by a craftsman, the number of radios dedicated to a particular sector can not be readily changed to meet dynamically changing use patterns. Hence some sector facilities may be over burdened while other sectors are underutilized.

SUMMARY OF THE INVENTION

The receiving antennas of a cellular telephone system are each connected to a unique antenna connecting path. Each antenna connecting path is connected to a signal divider which divides the antenna connecting path into a plurality of radio channel unit connecting paths. One radio channel unit connecting path from each of the plurality of signal dividers is connected to a controllable switch which in turn selectively couples a radio channel unit connecting path to a transceiver. There is a unique controllable switch for each transceiver.

For the transmission of signals from base station radio transceivers, the output of each transceiver is connected to a unique controllable switch which in turn selectively couples the transceiver output to any one of a plurality of signal combiners. Each of the signal combiners combines the radio channel unit transmit path with a plurality of other channel unit transmit paths into one antenna connecting path. Each antenna connecting path is associated with a unique transmitting antenna.

The antenna transmission/receive paths comprising the signal divider/combiners are embodied as strip type transmission lines in a multi layer PCB with all the paths having equal signal transmission loss. Micro vias are provided to permit electrical access to the various layers. The controllable switches are surface mounted on the outside of the PCB and are coupled to the various dividers through the micro vias. Remote control of the switches permits a radio channel unit transceiver to be connected to any one of the array of antennas.

DETAILED DESCRIPTION

Figure 1:
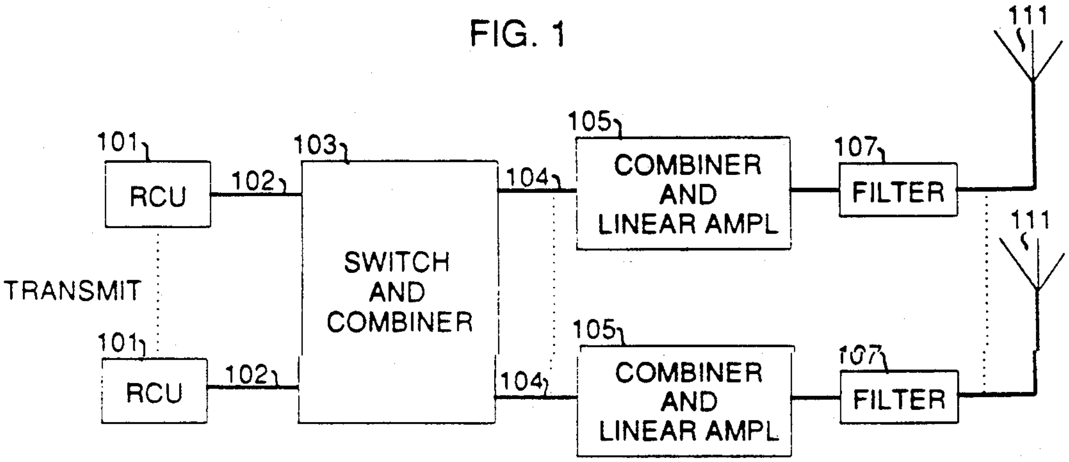
FIG. 1 is a block schematic of a transmission path connecting a plurality of radio channel transmitters to a plurality of antennas of the cell site.

A block schematic of a transmission path connecting a plurality of radio channel unit transmitters 101 to a plurality of antennas 111 is shown in FIG. 1. Each radio channel unit transmitter 101 is connected via individual circuit paths 102 to a selector switch and signal combiner 103 which places all the incoming individual signals from transmission paths 102 on one of a plurality of output transmission paths 104. From there the output of the selected transmission path may be further combined in the transmission process, however these functions are not disclosed in order to simplify the illustrative system.

The signals on the selected output transmission path 104 are applied to a combining and amplification circuitry 105 which includes a highly linear amplifier and which is capable of handling a plurality of message signals with a minimum of distortion. The output of this amplifier circuitry 105 is applied in this particular selected circuit path, via a filter 107 to a selected one of a plurality of transmitting antennas 111.

Figure 2:
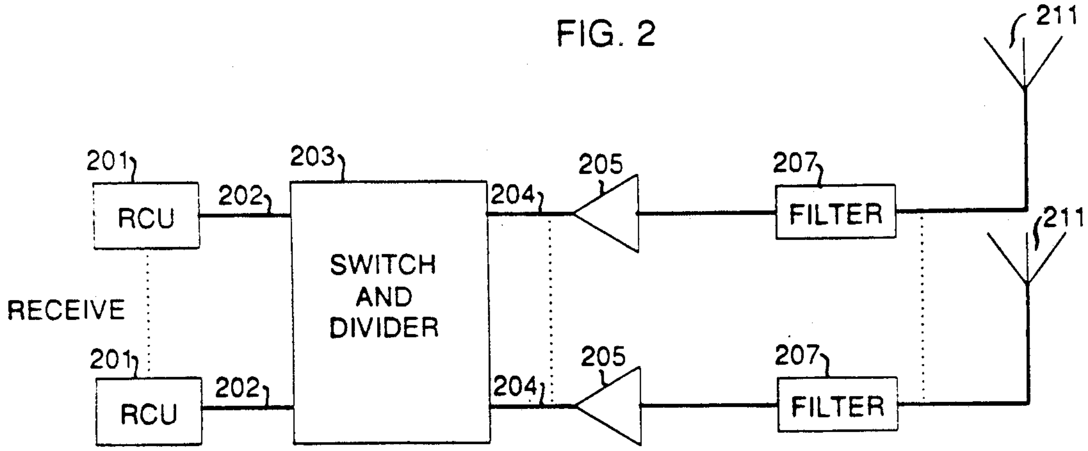
FIG. 2 is a block schematic of a receiving path connecting a plurality of antennas of the cell site to a plurality of radio channel unit receivers.

A reception path coupling a selected one of a plurality of receiving antennas 211 to a plurality of radio channel unit receivers 201 is shown in block schematic form in FIG. 2. The received signal is transmitted, via a filter 207, and a pre amplifier 205 to a signal divider and selector switch 203 which splits the received signal to a the plurality of receiving paths 202 each coupled in turn to a radio channel unit receiver 201.

Figure 3:
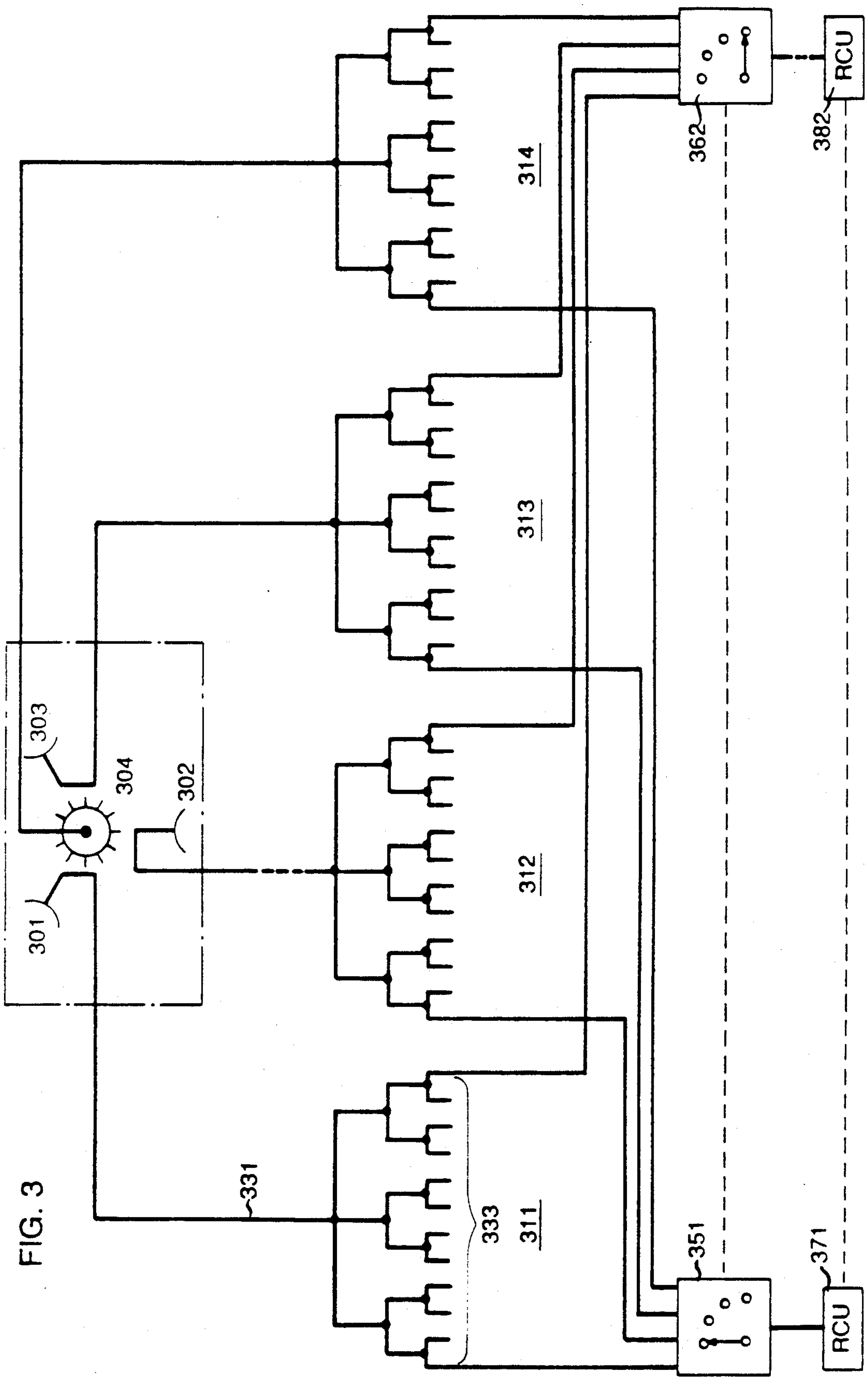
FIG. 3 is a block schematic of the signal divider/-combiner and power switch path arrangement between an antenna array and the radio channel units.

A schematic of the generalized switch divider/combiner topology applicable to both transmission and reception paths is schematically disclosed in FIG. 3. An illustrative cell site antenna array having three directional antennas 301,302 and 303 and an omni-directional antenna 304. Each antenna is coupled (although not necessarily directly connected) to a signal divider/combiner 311-314. Each signal divider/combiner in the illustrative embodiment divides by a 1:12 ratio (reception) or combines a signal in a 12:1 ratio (transmission) by transforming a circuit path having one lead at one terminal end having one lead 331 to twelve leads 333 at the other terminal end of the switch. Each conducting path traverse through the signal combiner/divider has a substantially identical overall path impedance so that a signal will be accurately divided or combined with a uniform attenuation. These identical overall path impedances are achieved by making path lengths substantially identical where ever possible and by inserting signal attenuation means within selected paths where needed to compensate for path traverse length differences. An illustrative example is discussed below with reference to FIG. 5.

Each one of the twelve leads of terminal end 333 of each signal divider/combiner 311-314 is connected to one of twelve single pole four throw switch (there is one throw connection for coupling to each individual antenna) which in turn connects each one of these leads to a particular radio channel unit. In the illustrative embodiment there are twelve four throw switches 351-362 connected to twelve radio channel units 371-382, respectively, however, it is to be understood that may other combinations are within the scope of the invention. Hence, it is readily apparent that this arrangement permits each of the twelve radio channel units 371-382 to be connected to any one of the four antennas 301-304.

In a transmission arrangement, message signals would originate in a radio transmitter in the radio channel unit 371 for example. The transmitted signal would be coupled to the single pole-four throw switch 351. Its particular pole throw connection determines which of the signal divider/combiners it is connected to. With the pole throw connector illustrated, the transmitted signal is connected to the left most lead of signal divider/combiner 311. It is transmitted to the lead 331 and from there to antenna 301.

In a receiving arrangement, the in-coming message signal received by antenna 301, for example, would be applied to lead 331 and by the signal splitting action of signal divider/combiner 311 appears at all twelve of its terminal leads 333. In this illustrative embodiment, it would be coupled by the single pole four throw switch 351 to a radio receiver at radio channel unit 371. It is to be understood that the schematically shown apparatus of FIG. 3 is not a single circuit with transmitting and receiving modes. Transmission and reception requires different circuits due to the differing signal amplification and signal isolation requirements.

Figure 4:
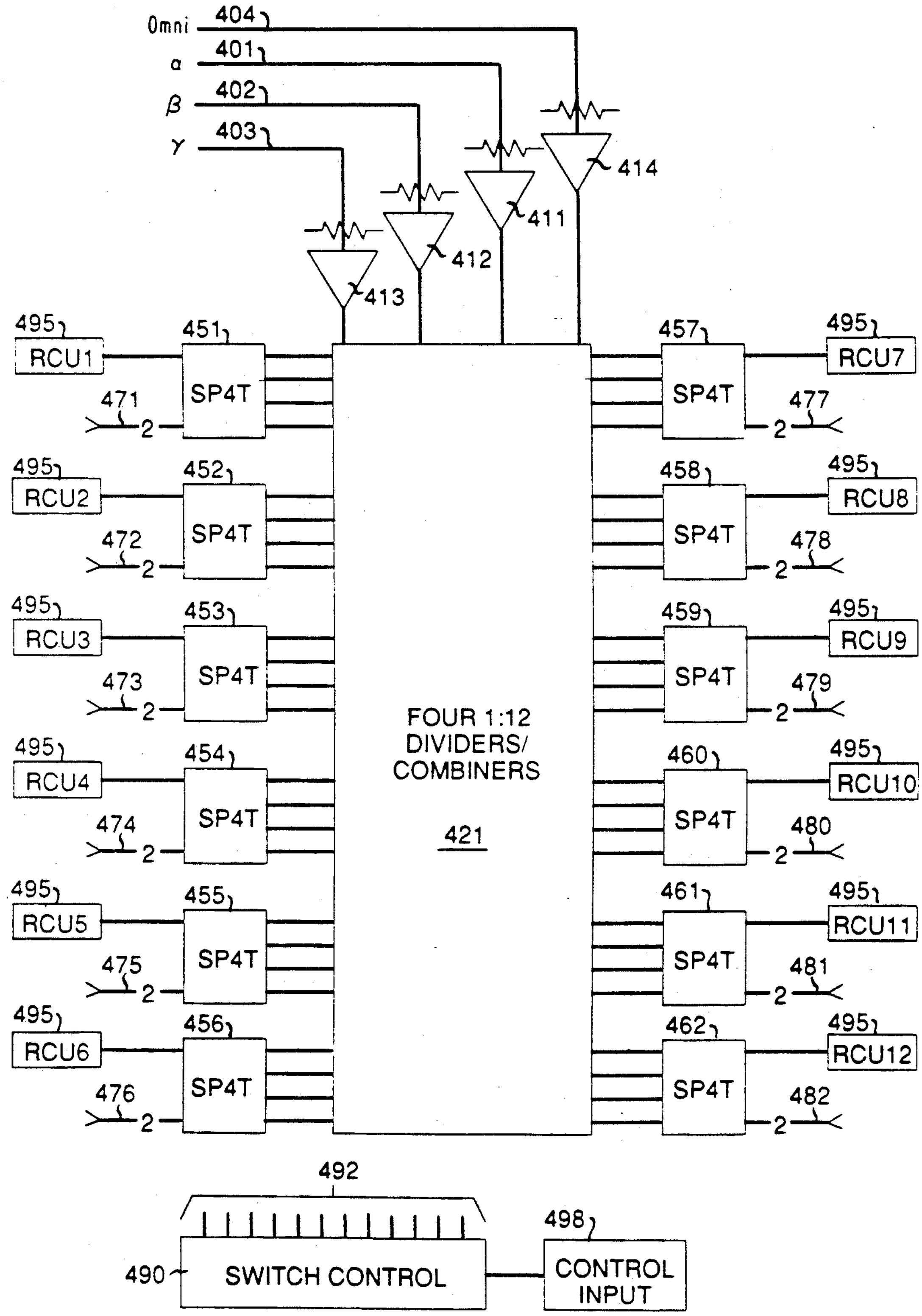
FIG. 4 is a block schematic of the signal dividers/-combiners and power switch with the switching control.

This particular arrangement is shown in generalized block schematic form in FIG. 4 where the four antennas designated $\alpha$, $\beta$, $\gamma$ and omni are coupled to the connecting leads 401-404. These connecting leads 401-404 are connected, via the amplifiers 411-414 in a receiving version of the circuitry, to four switch divider/combiners designated as the block 421. In a transmission version of the circuitry these amplifiers 411-414 are either oppositely directed or not needed. These four signal divider/combiners in block 421 are coupled to the twelve single pole four throw switches 451-462 in the manner indicated in FIG. 3. Each of the signal pole four throw switches in the illustrative embodiment is an electronically controllable semiconductor switch arrangement. In the illustrative embodiment the switches 451-462 utilize gallium-arsenide FET switches in a logical circuit where the pole-throw connection is responsive to an applied input switch control code. A requirement of the switch, particularly for transmission arrangements, is the provision of a high degree of electrical isolation between the poles and the individual throw contacts. A value of 45 dB of isolation between pole and throw contact is provided in the illustrative embodiment.

Each of the switches 451-462 includes a control input designated by switch control inputs 471-482. A code applied to this input determines the pole-throw connection of the switch. In the illustrative embodiment this is a two bit code applied on a two lead input as indicated by the "2" designation. This code is provided by a switch control circuit 490 which is illustratively functionally shown as having twelve independent two lead outputs 492 that are coupled to the twelve switch control inputs 471-482, respectively. This switch control 490 may be pratically embodied by having switch control logic circuitry being resident on individual radio channel units. Each radio channel unit in this arrangement has twelve independent two lead outputs which are coupled to the twelve switch control inputs 471-482.

The individual codes are provided to each switch by the radio channel unit connected to that particular switch in order to control the connection of a particular antenna to each one of the twelve radio channel units 495 connected to the twelve switches 451-462. Switch control 490 is shown as being functionally responsive to a control input 498. Such a control input may be manually applied or it may be accomplished by an automatic control entity which analyzes cellular phone traffic and selects radio channel unit-antenna connections to optimize the utilization of system resources.

Figure 5:
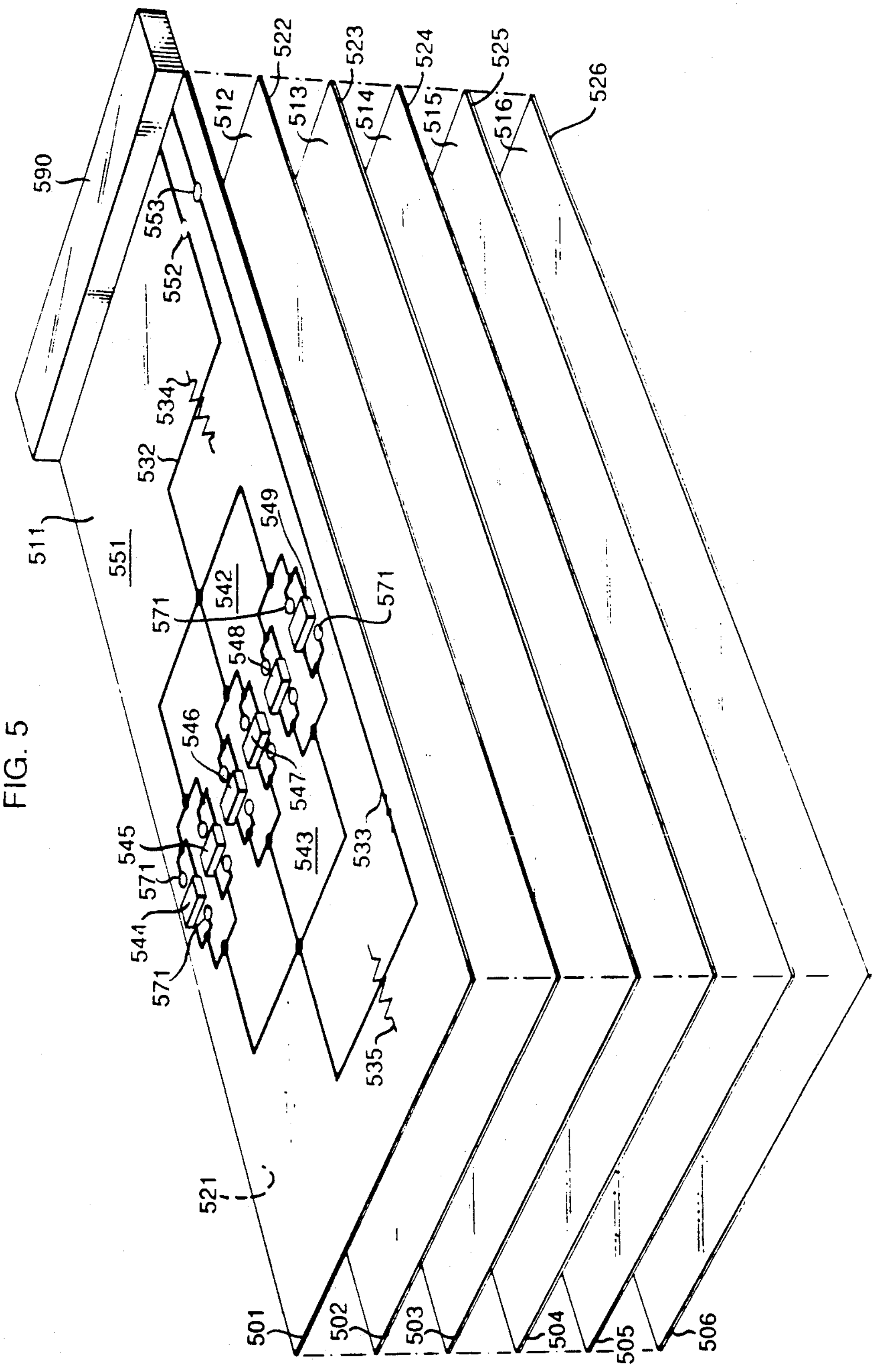
FIG. 5 is a perspective view of an illustrative embodiment of the power divider/combiner and power switch apparatus.

The signal divider/combiners and the pole-throw switches are all embodied in a single integrated circuit package as shown in FIG. 5. This circuit package comprises a plurality of substrates 501 through 506 which are layered and bonded together to form a multi layer circuit package which comprises circuitry formed on the twelve layers in the illustrative embodiment shown in FIG. 5. Each individual layer has a specific circuit pattern to perform a specific function. The signal transmission paths for two of the signal divider/combiner arrays are deposited to form the array of strip type transmission lines 551 on the top layer 511 of substrate 501. These particular transmission lines, sometimes designated as flat strip conductors, are formed with a strip conductor deposited above a single ground plane. This ground plane is formed on the bottom layer 521 of the substrate 501. Additional circuitry is formed on the inner layers. Layer 512 of substrate 502 contains DC power distribution circuitry, switch logic distribution circuitry and a ground plane. Layer 522 of substrate 502 contains DC power distribution circuitry and a ground plane. Layer 513 of substrate 503 contains a ground plane while layer 523 contains strip type transmission circuitry ground plane. Layer 514 and 524 of substrate 504 contains signal input/output strip type transmission circuitry and a ground plane. Layer 514 also contains DC power distribution circuitry. Layer 515 of substrate 505 contains signal input/output strip type transmission circuitry and a ground plane while layer 525 contains a ground plane. Layer 516 of substrate 506 contains ground plane. The remaining two signal combiner/divider arrays similar to layer 511 utilizing strip type transmission lines are deposited on the bottom layer 526 of substrate 506.

A typical layout of the strip type transmission lines 551 forming the switch divider/combiner circuit paths is illustratively shown for the top surface 511 of the substrate 501. Two surface terminals 552 and 553 are connected to a connecting block, having coaxial receptacles for rf signals, which enables the coupling of circuits within the switch package to an rf backplane of a circuit support frame. The terminals 552 and 553 are connected, via the strip like transmission paths 532 and 533, to the two 12:1 divider/combiner arrays 542 and 543, respectively. The attenuators 534 and 535 are included in the paths 532 and 533 to compensate for the differences in path length of transmission paths 532 and 533 by equalizing the overall transmission path loss.

Two signal divider/combiner arrays and six single pole four throw switches are included on the bottom layer 526. These arrays are also connected to the connector block and in addition include attenuators for equalizing transmission path losses.

Six of the multiple terminal ends of each of the two 12:1 signal divider/combiner arrays on top layer 511 are connected to the throw terminals of the pole-throw switches 544–549. These switches have their pole terminals connected to the connector block for connecting them to the radio channel units. Switches 544–549 are surface mounted on the top and bottom layers 511 and 526 respectively in the illustrative embodiment. Connections to the inner signal divider/combiner arrays are by micro-vias (holes in the substrate with conductive plating). The other six multiple terminal ends of each of the two 12:1 signal divider/combiner arrays on the top layer 511 are connected to the six single-pole-four throw switches on bottom layer 526 via the micro-vias 571.

While a specific illustrative embodiment of the invention has been disclosed it is to be understood that many varied embodiments will suggest themselves skilled in the art without departing from the spirit and scope of the invention.

We claim:

1. In a cellular radiotelephone system a radio antenna interconnection arrangement for enabling connection of a plurality of radio transceivers to selected ones of a plurality of antennas to accommodate changes in subscriber traffic patterns, comprising:

coupling circuitry for connecting to a plurality of antennas;

a plurality of tree structured connecting circuits, each having a single terminal end and a plurality of bifurcating conducting branches deriving from the single terminal end and each of said bifurcating conducting branches having further bifurcating branches branches to provide a multiplicity of terminal ends;

the single terminal end of each of the plurality of tree structured connecting circuits being connected to the plurality of antennas respectively through the coupling circuitry, the plurality of radio transceivers equaling the number of terminal ends of the multiplicity of terminal ends;

a plurality of multiple lead-to-single lead controlled switching devices sufficient in number so that each one of the multiple leads is associated with a corresponding selected individual terminal end of the number of a multiplicity of terminal ends of each of the plurality of tree structured connecting circuits and having its single lead connected to and operative to enable a connection from one of the multiple leads to a specific one of the plurality of radio transceivers, signal attenuators inserted in individual transmission paths of the plurality of tree structured connecting circuits to equalize signal loss regardless of signal path length between the single terminal end and the multiplicity of terminal ends, and a switch control connected to the switching devices and responsive to a control input representative of cellular phone traffic and operative for controlling switching states of the switching devices to control connection of a particular radio transceiver to a particular antenna.

2. In a cellular radiotelephone system a radio antenna interconnection arrangement as claimed in claim 1, wherein the plurality of tree structured connecting circuits are deposited on individual substrates of a plurality of circuit substrates; and the switching devices are semiconductor switches mounted on one of the individual substrates.

3. In a cellular radiotelephone system a radio antenna interconnection arrangement for enabling connection of a plurality of radio transceivers to selected ones of a plurality of antennas to accommodate changes in subscriber traffic patterns, comprising:

coupling circuitry for connecting to first, second, third and fourth antennas;

first, second, third and fourth tree structured connecting circuits, each having a single terminal end and a plurality of bifurcating conducting branches deriving from the single terminal end and each of said bifurcating conducting branches having further bifurcating branches to provide a multiplicity of terminal ends;

the single terminal end of each of the first, second third and fourth tree structured connecting circuits being connected to the first, second, third and fourth antennas respectively through the coupling circuitry, the plurality of radio transceivers equaling the number of terminal ends of the multiplicity of terminal ends;

a plurality of multiple lead-to-single lead controlled switching devices sufficient in number so that each one of the multiple leads is associated with a corresponding selected individual terminal end of the multiplicity of terminal ends of each of the first, second third and fourth tree structured connecting circuits and having its single lead connected to and operative to enable a connection from one of the multiple leads to a specific one of the plurality of radio transceivers, signal attenuators inserted in individual transmission paths of the first, second third and fourth tree structured connecting circuits to equalize signal loss regardless of signal path length between the single terminal end and the multiplicity of terminal ends, and a switch control connected to the switching devices and responsive to a control input representative of cellular phone traffic and operative for controlling switching states of the switching devices to control connection of a particular radio transceiver to a particular antenna.

4. In a cellular radiotelephone system a radio antenna interconnection arrangement as claimed in claim 3, wherein the first, second third and fourth tree structured connecting circuits are deposited on individual substrates of a plurality of circuit substrates; and the switching devices are semiconductor switches mounted on one of the individual substrates.

* * * * *